(12) United States Patent
Ohura

(10) Patent No.: US 6,802,400 B2
(45) Date of Patent: Oct. 12, 2004

(54) BRAKING DEVICE FOR STRADDLE-TYPE ALL-TERRAIN VEHICLE

(75) Inventor: Kousei Ohura, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 1 day.

(21) Appl. No.: 10/334,914

(22) Filed: Jan. 2, 2003

(65) Prior Publication Data

US 2003/0132067 A1 Jul. 17, 2003

(30) Foreign Application Priority Data

Jan. 11, 2002 (JP) ........................................ 2002-005177

(51) Int. Cl.[7] .............................................. F16D 55/08
(52) U.S. Cl. ..................... 188/72.9; 188/20; 188/72.1; 188/79.55; 180/349
(58) Field of Search ...................... 188/72.9, 20, 72.3, 188/72.1, 79.55; 180/349, 370, 215; 74/560, 512

(56) References Cited

U.S. PATENT DOCUMENTS 3,647,015 A * 3/1972 Plessinger ................... 180/217
4,325,565 A * 4/1982 Winchell ..................... 280/282
4,487,282 A * 12/1984 Wakatsuki et al. .......... 180/210
6,182,800 B1 * 2/2001 Mochizuki et al. ........ 188/71.5
6,401,857 B1 * 6/2002 Hisada et al. ............... 180/344
6,431,328 B1 * 8/2002 Tagami et al. ................ 188/31

FOREIGN PATENT DOCUMENTS

JP 59-220472 A 12/1984
JP 5-105150 A 4/1993

* cited by examiner

Primary Examiner—Matthew C. Graham
Assistant Examiner—Mariano Sy
(74) Attorney, Agent, or Firm—Nixon & Vanderhye, P.C.

(57) ABSTRACT

A braking device for a four-wheel buggy including rear swing arms which are attached to a vehicle body frame such that the rear swing arms can swing vertically, an axle shaft attached to the ends of the rear swing arms, and wheels disposed one at each end of the axle shaft is disposed above the axle shaft. The braking device is constructed as a mechanical braking device including a brake drum and a brake shoe which apply a braking force to the wheels, a brake cam lever which activates the brake, and a rear brake operating cable used for operating the brake cam lever. The brake cam lever is provided with a projecting portion which is formed integrally with the brake cam lever at a position below a connecting portion with the rear brake operating cable, the projecting portion protecting the lower side of the connecting portion.

8 Claims, 4 Drawing Sheets

BRAKING DEVICE FOR STRADDLE-TYPE ALL-TERRAIN VEHICLE

BACKGROUND OF THE INVENTION

1. Field of the Invention

The present invention relates to structures of straddle-type all-terrain vehicles, and more specifically relates to a braking device for a straddle-type all-terrain vehicle.

2. Description of the Related Art

According to straddle-type all-terrain vehicles disclosed in Japanese Patent Applications Laid-open Sho 59 No.220472 and Hei 5 No.105150, braking devices are provided on axle shafts which are pivotally supported at the ends of the left and right swing arms. In order to protect the braking devices from obstacles and loose stones while the vehicles are in driving state, structures in which a plate-like guard member disposed under the swing arms have been proposed.

However, according to the above-proposed measures, since a separate guard must be formed, the number of parts increases. Therefore, there is a drawback in that the manufacturing cost, the number of fabrication steps, and the vehicle weight also increase.

SUMMARY OF THE INVENTION

In order to solve the above-described problems, an object of the present invention is to provide a braking device for a straddle-type all-terrain vehicle which can be protected by a simple structure without using the separate guard.

A braking device according to the present invention is used in a straddle-type all-terrain vehicle including rear swing arms which are attached to a vehicle body frame such that the rear swing arms can swing vertically, an axle shaft attached to the ends of the rear swing arms and extending in the lateral direction of the vehicle body, and a pair of wheels disposed one at each end of the axle shafts. The braking device is disposed above the axle shaft and is constructed as a mechanical braking device including a braking member which applies a braking force to the wheels; a swingable brake arm which activates the braking member; and a brake operating cable which is connected to a brake pedal or a brake lever at one end and to the brake arm at the other end, wherein the brake arm is provided with a projecting portion which is formed integrally with the brake arm at a position below a connecting portion with the brake operating cable, the projecting portion protecting the lower side of the connecting portion.

More specifically, according to the present invention, the braking device is disposed above the axle shaft in the straddle-type all-terrain vehicle having wheels disposed at the ends of the axle shaft, which is attached to the ends of the rear swing arms. Therefore, the braking device can be protected from an obstacle projecting on the road during driving.

In addition, the mechanical braking device includes the brake arm which activates the braking member by using the brake operating cable when the brake pedal or the brake lever is operated, and the brake arm is provided with the projecting portion which is formed integrally with the brake arm at a position below the connecting portion with the brake operating cable. Accordingly, a separately formed under-guard is not necessary. The projecting portion can be formed by using a simple die at a low cost, and fabrication processes can be more easily performed compared to when a separately formed component is used.

Preferably, a fulcrum around which the brake arm swings is disposed behind the axle shaft at the right or the left side of the main body of the braking device, and the brake arm extends vertically and is constructed such that the brake arm activates the braking member by swinging in the direction opposite to the direction in which the projecting portion extends. In such a case, even when the brake arm might happen to come into contact with an obstacle, such as a rock, a stub, etc., on the road during driving, the impact applied to the brake arm due to the contact can be reduced by the rotation of the brake arm. Accordingly, damage to the brake arm and the braking device can be minimized.

In addition, the projecting portion preferably extends toward the rear, and at least a part of the rear end area of the projecting portion is preferably formed so as to incline upward toward the rear. In such a case, even when the brake arm might happen to come into contact with an obstacle on the road during driving, damage to the brake arm and the braking device can be minimized.

In addition, according to the present invention, the connecting portion between the arm and the brake operating cable is preferably provided with a buffer portion which allows forward movement of the brake arm alone. In such a case, even when the brake arm is operated unexpectedly, the operation is not transmitted to the brake operating cable. Therefore, it becomes possible to improve durability of the brake operating cable. Furthermore, since the rotational movement is not transmitted to the brake pedal or the brake lever as well, which is connected to the brake operating cable at one end thereof. Accordingly, the operational stability can also be improved.

Accordingly, the braking device of the straddle-type all-terrain vehicle according to the present invention provides an excellent effect in that the braking device can be protected with a simple structure without using a guard.

DESCRIPTION OF THE PREFERRED EMBODIMENT

An embodiment of the present invention will be described in detail below with reference to the accompanying drawings.

Figure 1:
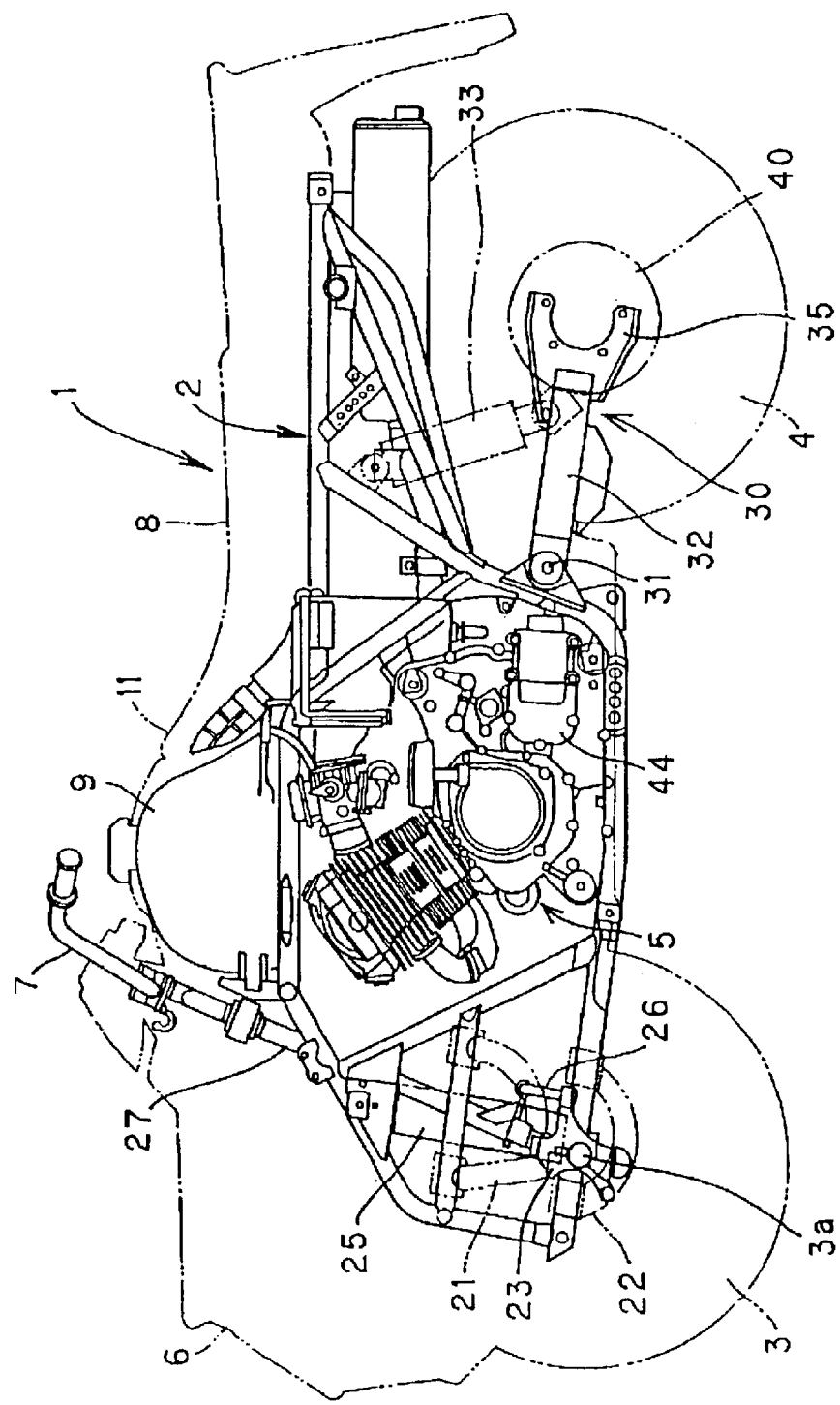
FIG. 1 is a four-wheel buggy containing a braking device for a straddle-type all-terrain vehicle according to an embodiment of the present invention.
Figure 2:
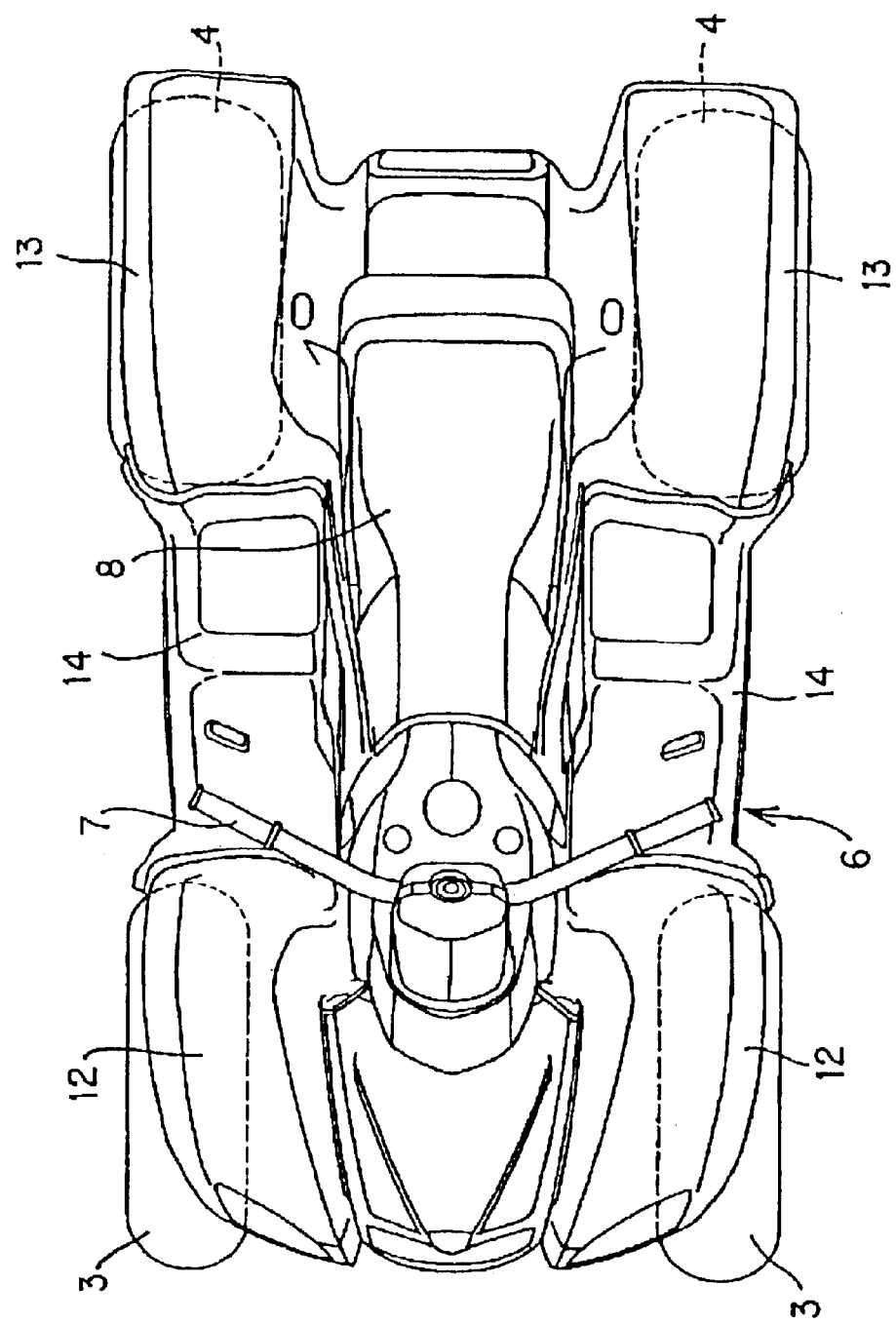
FIG. 2 is a plan view of the overall construction of the four-wheel buggy.
Figure 3:
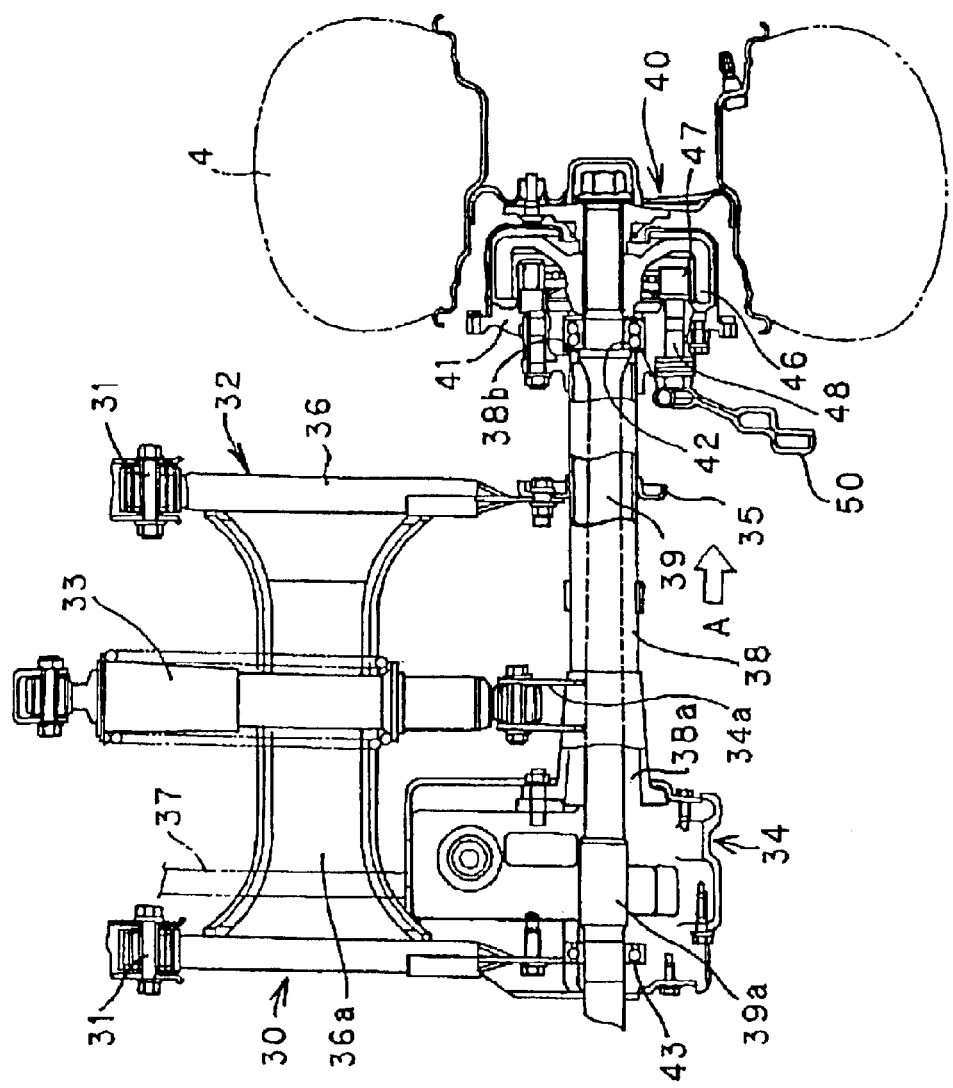
FIG. 3 is a sectional view showing the construction of a rear drum brake of the four-wheel buggy.
Figure 4:
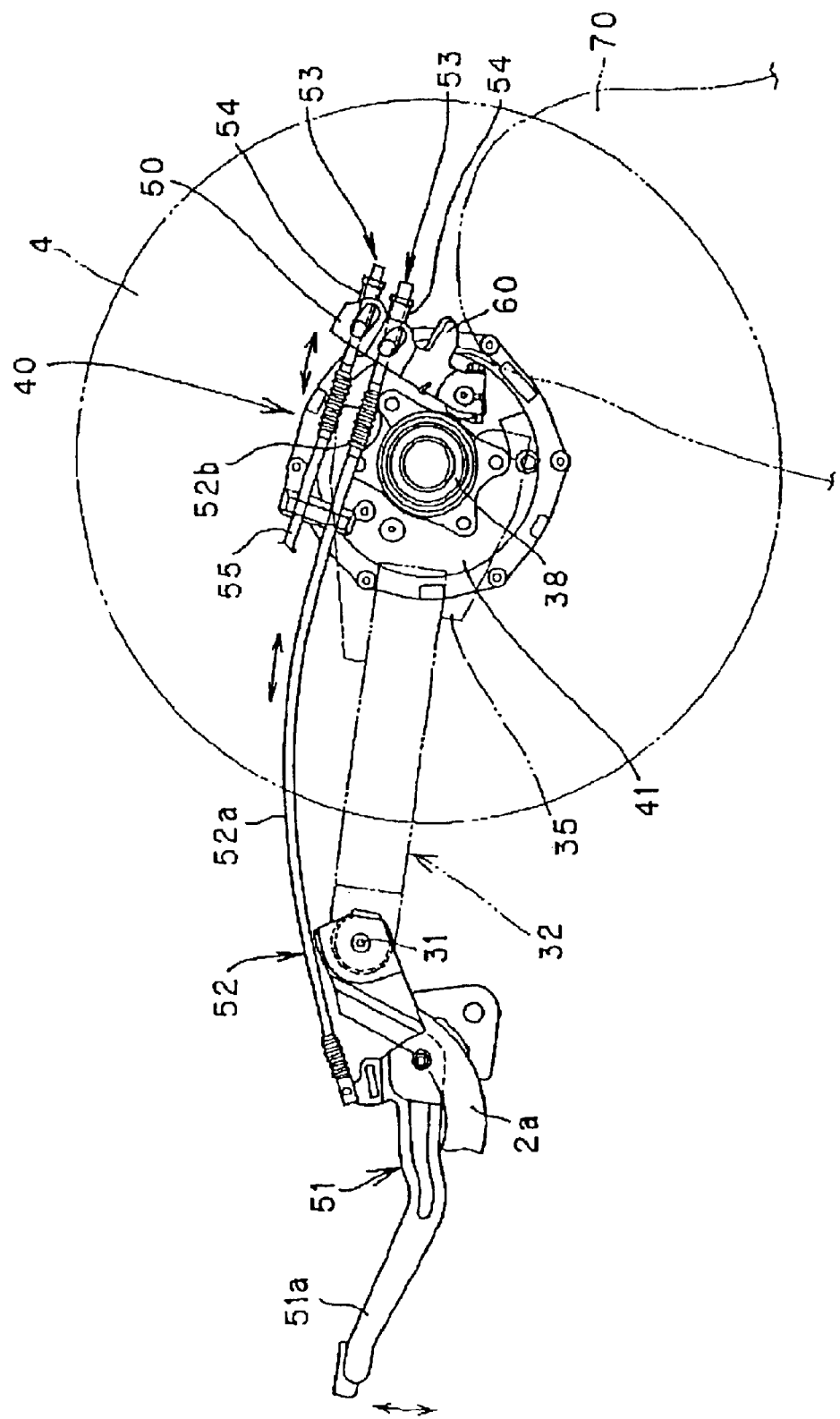
FIG. 4 is a diagram showing the construction of the rear drum brake seen from the direction shown by the arrow A in FIG. 3.

FIGS. 1 to 4 show an embodiment of the present invention, where FIG. 1 is a side view showing the overall construction of a four-wheel buggy having a braking device according to an embodiment of the present invention, FIG. 2 is a plan view showing the overall construction of the four-wheel buggy, FIG. 3 is a sectional view showing the construction of a rear drum brake of the four-wheel buggy, and FIG. 4 is a diagram showing the construction of the rear drum brake seen from the direction shown by the arrow A in FIG. 3.

With reference to FIGS. 1 and 2, a small, straddle-type all-terrain vehicle according to the present embodiment is a so-called four-wheel buggy 1 for driving on rough terrains which includes a braking device according to the present invention. The four-wheel buggy 1 includes front wheels 3 disposed at the right and left sides at the front of a vehicle body frame 2 and rear wheels 4 disposed at the right and left sides at the rear of the vehicle body frame 2. In addition, an engine 5 for driving the rear wheels 4 is disposed at the central position between the front wheels 3 and the rear wheels 4.

The four-wheel buggy 1 also includes a vehicle body cover 6 which covers the vehicle body frame 2, the front wheels 3, and the rear wheels 4, a steering handle 7 disposed above the vehicle body frame 2 and used for operating the front wheels 3, and a seat 8 which is disposed behind the steering handle 7 in the longitudinal direction of the vehicle body.

The engine 5 is disposed at the central position of the four-wheel buggy 1, and a fuel tank 9 is disposed above the engine 5 in front of the seat 8. Side surfaces of the fuel tank 9 in the lateral direction of the vehicle body are covered with a fuel tank cover 11.

The vehicle body cover 6 includes front mudguards, that is, so-called front fenders 12, which cover the upper and rear portions of the front wheels 3, and rear mudguards, that is, so-called rear fenders 13, which cover the front and upper portions of the rear wheels 4. In addition, floor portions 14 for receiving the driver's feet extend from the rear ends of the front fenders 12 to the front ends of the rear fenders 13.

An upper front suspension arm 21 and a lower front suspension arm 22 are swingably retained at each side of the vehicle body frame 2 at the front of the vehicle body frame 2 such that the upper front suspension arm 21 and the lower front suspension arm 22 can swing vertically. In addition, a knuckle arm 23 is swingably retained at the front ends of the upper front suspension arm 21 and the lower front suspension arm 22 at each side of the vehicle body.

The front wheels 3 are rotatably attached to a front wheel shaft 3a which is fixed between the knuckle arms 23 at the right and left sides. Each of the front wheels 3 is retained by a front cushion 25 at the front end of the lower front suspension arm 22, the front cushion 25 being connected to the vehicle body frame 2.

The front wheels 3 are connected to a steering shaft 27 with a steering mechanism (not shown) including a tie rod 26 therebetween. The steering handle 7 is formed integrally with the steering shaft 27 at the upper end thereof, and the front wheels 3 turn rightward and leftward by turning the steering handle 7 rightward and leftward.

As shown in FIGS. 1 and 3, a rear wheel suspension device 30 is disposed at the rear of the vehicle body frame 2.

With reference to FIGS. 1 and 3, the rear wheel suspension device 30 is disposed behind the engine 5 at the lower rear of the vehicle body frame 2. The rear wheel suspension device 30 includes rear swing arms 32 which are attached to pivot shafts 31 such that the rear swing arms 32 can swing vertically and a rear suspension unit 33 which is used for damping the swinging motion of the rear swing arms 32.

In addition, as shown in FIGS. 1 and 3, one of the rear swing arms 32 is connected to a final gear case 34 used for transmitting the driving force to the rear wheels 4 disposed at right and left sides in the lateral direction at the rear of the vehicle body, and the other rear swing arm 32 is connected to an axle plate 35 used for retaining the rear wheels 4. A swing arm tube 36 is integrally formed with the axle plate 35, and a drive shaft 37 which transmits the driving force obtained from the engine 5 is connected to the final gear case 34.

In addition, as shown in FIGS. 1 and 3, a suspension attaching bracket 34a to which one end of the rear suspension unit 33 is attached is formed at the upper side of the final gear case 34 such that the bracket 34a projects from the final gear case 34. The rear suspension unit 33 is attached to the vehicle body frame 2 at approximately the center thereof in the lateral direction of the vehicle body such that the rear suspension unit 33 inclines forward.

With reference to FIGS. 3 and 4, swing arm tubes 36 are disposed at the right and left sides in the lateral direction of the vehicle body, and are arranged parallel to each other across the drive shaft 37 in plan view. In addition, in cross-section, the swing arm tubes 36 have elliptical shapes which extend vertically when the rear swing arms 32 are attached to the vehicle body frame 2.

In addition, the final gear case 34 is attached to the axle plate 35 disposed at the rear end of one of the swing arm tubes 36 of the rear swing arms 32, and a swing arm bridge 36a is integrally formed with the swing pipes 36 between the swing arm tubes 36. The swing arm bridge 36a extends in the lateral direction of the vehicle body between the swing arm tubes 36 disposed at the right and left sides, and the drive shaft 37 is disposed above the swing arm bridge 36a.

The rear swing arms 32 are retained by the rear suspension unit 33, which is connected to the vehicle body frame 2 at a position higher than the rear swing arms 32 and at the central region between the rear swing arms 32, and which is attached to the final gear case 34. A cylindrical axle housing 38 is attached to the rear swing arms 32 at the ends thereof, and an axle shaft 39 is disposed inside the cylindrical axle housing 38.

A rear drum brake panel 41 is attached to the cylindrical axle housing 38 at an outer opening 38b which faces toward the outside of the vehicle body, and an inner opening 38a of the cylindrical axle housing 38 which faces toward the inside of the vehicle body is fixed to the final gear case 34.

The axle shaft 39 is rotatably fitted inside a bearing 42 fixed to the rear drum brake panel 41 and a bearing 43 fitted inside the final gear case 34.

A serration 39a is formed on the axle shaft 39 at a central position thereof, and the driving force obtained by the engine 5 is transmitted to the axle shaft 39 via a clutch/transmission device 44 and the drive shaft 37. In addition, the axle shaft 39 is engaged with a gear installed in the final gear case 34, and the rear wheels 4 are rotatably disposed thereby.

In addition, as shown in FIG. 3, a brake drum 46 of a braking device 40 is formed integrally with the axle shaft 39 at an end thereof, and a brake cam shaft 48 which presses a brake shoe 47 against the inner periphery of the brake drum 46 and separates them from each other is formed integrally with a brake cam lever 50.

As shown in FIG. 4, a brake pedal 51 is attached to a lower rear end 2a of the vehicle body frame 2 such that the brake pedal 51 can swing vertically at its front end 51a. The brake pedal 51 and the brake cam lever 50 are connected to each other with a rear-brake operating cable 52. When the brake pedal 51 is stepped on and pushed downward, the brake cam lever 50 presses the brake shoe 47 against the inner periphery of the brake drum 46, and a braking force generated by the friction between the brake shoe 47 and the inner periphery of the brake drum 46 is applied to the rear wheel 4 so as to restrain thereof.

The rear-brake operating cable 52 extends between the brake pedal 51 and the brake cam lever 50 above the rear swing arm 32. A middle region 52a of the rear-brake operating cable 52 is formed of a flexible wire, so that it can swing along with the rear swing arm 32.

A cable adjustment mechanism 53 is disposed at the end of the rear-brake operating cable 52 close to the brake cam lever 50 such that the cable adjustment mechanism 53 protrudes rearward from the brake cam lever 50. The cable adjustment mechanism 53 is constructed such that the length of the rear-brake operating cable 52 can be adjusted by using an adjusting nut 54.

A parking-brake operating cable 55 is also disposed above the rear-brake operating cable 52 such that the parking-brake operating cable 55 and the rear-brake operating cable 52 extend approximately parallel to each other. Similarly to the rear-brake operating cable 52, a cable adjustment mechanism 53 is attached to the parking-brake operating cable 55 at the rear end thereof.

The brake cam lever 50 is provided with a projecting portion 60 which projects parallel to the cable adjustment mechanisms 53 by approximately the same amount at a position below the cable adjustment mechanisms 53.

The projecting portion 60 is formed integrally with the brake cam lever 50 by sheet metal forming such that the lower surface of the projecting portion 60 is inclined upward toward the rear in the side view, as shown in FIG. 4.

Next, the operation of the braking device according to the present embodiment will be described.

As shown in FIG. 4, the braking device 40 for applying the braking force to the rear wheel 4 is activated when a front end portion 51a of the brake pedal 51 is pushed downward. When the brake pedal 51 is rotated in the counterclockwise direction in the figure, the rear-brake operating cable 52 is pulled toward the front. Accordingly, the brake cam lever 50 connected to the rear-brake operating cable 52 also rotates counterclockwise.

Then, the brake shoe 47 moves in association with the brake cam lever 50 and comes into contact with the inner periphery of the brake drum 46, so that the braking force generated by the friction between the brake shoe 47 and the inner periphery of the brake drum 46 is applied to the rear wheel 4 so as to restrain thereof.

When, for example, the rear wheel 4 of the four-wheel buggy 1 climbs over an obstacle 70 such as a large rock during driving, as shown in FIG. 4, or when the four-wheel buggy 1 drives by the obstacle 70, there is a possibility in that components disposed at positions lower than the height of the obstacle 70 might come into contact with the obstacle 70.

According to the present embodiment, components for operating the braking device 40 are placed at positions higher than other components.

More specifically, as shown in FIG. 4, the brake pedal 51 is disposed at a position higher than the vehicle body frame 2, the rear-brake operating cable 52 is disposed at a position higher than the rear swing arm 32, and an operating unit 52b of the rear-brake operating cable 52 is disposed at a position higher than the axle housing 38. Accordingly, none of the brake pedal 51, the rear-brake operating cable 52, and the operating unit 52b comes into contact with the obstacle 70 such as a rock.

Although the cable adjustment mechanisms 53 formed at the rear end of the rear-brake operating cable 52 project rearward from the brake cam lever 50, the projecting portion 60 which projects by approximately the same amount as the cable adjustment mechanisms 53 is formed at a position below the cable adjustment mechanisms 53.

Accordingly, even when the obstacle 70 such as a rock might come into contact with the brake cam lever 50, the obstacle 70 does not come into contact with the cable adjustment mechanisms 53 because it first encounters the projecting portion 60 disposed below the cable adjustment mechanisms 53.

In addition, when the brake cam lever 50 comes into contact with the obstacle 70, since the projecting portion 60 projects rearward, the brake cam lever 50 swings in the direction from the rear to the front, that is, in the counterclockwise direction in the figure. This movement leads to the above-described normal braking operation, so that the braking device 40 should not be damaged.

According to the present embodiment, since the brake cam lever 50 is provided with the projecting portion 60 which projects rearward by approximately the same amount as the cable adjustment mechanisms 53 at a position below the cable adjustment mechanisms 53, the braking device and the cable adjustment mechanisms 53 can be protected from obstacles on the road during driving.

In addition, according to the present embodiment, since the projecting portion 60 is formed integrally with the brake cam lever 50 by sheet metal forming, it can be manufactured easily from sheet metal by using a simple die at low cost. Furthermore, fabrication processes can be more easily performed compared to when separately formed components are used.

In addition, according to the present embodiment, the projecting portion 60 is formed in such a shape that the lower surface of the projecting portion 60 is inclined upward toward the rear. Therefore, even when the vehicle climbs over the obstacle 70 such as a rock, the projecting portion 60 easily slides past the front of the obstacle 70.

Although the projecting portion 60 is formed integrally with the brake cam lever 50 by sheet metal forming, in the present invention, the configuration of the projecting portion 60 is not limited to the integral forming of the projecting portion 60 with the brake cam lever 50. For example, a separately formed projecting portion may also be integrally attached to the brake cam lever by welding, by using screws, etc.

In addition, according to the present invention, the rear-brake operating cable 52 and the brake cam lever 50 are connected to each other such that the movement of the rear-brake operating cable 52 is directly transmitted to the brake arm 50. However, in the present invention, the configuration of the cable adjustment mechanism is not limited to the configuration of direct connection between the brake operation cable and the brake arm. For example, the connecting portion between the brake operating cable and the brake arm may be provided with a buffer portion which allows a forward movement of the brake arm alone. According to such a configuration, even when the brake arm is operated suddenly, the brake pedal, or the brake lever, connected to the brake operating cable at an end thereof does not rotate, so that the operational stability can be improved.

Furthermore, the present invention is not limited to the above-described embodiment shown in the figures, and various modifications are of course possible within the scope of the present invention.

What is claimed is:

1. A braking device for a straddle-type all-terrain vehicle including rear swing arms which are attached to a vehicle body frame such that the rear swing arms can swing vertically, an axle shaft attached to the ends of the rear swing arms and extending in a lateral direction of the vehicle body frame, and a pair of wheels disposed one at each end of the axle shaft, the braking device being disposed above the axle shaft and being a mechanical braking device comprising:

a braking member which applies a braking force to the wheels;

a swingable brake arm which activates the braking member; and a brake operating cable which is connected to a brake pedal or a brake lever at one end and to the brake arm at the other end, wherein the brake arm is provided with a projecting portion which is formed integrally with the brake arm at a position below a connecting portion with the brake operating cable, the projecting portion protecting a lower side of the connecting portion.

2. A braking device for a straddle-type all-terrain vehicle according to claim 1, wherein a fulcrum around which the swingable brake arm swings is disposed behind the axle shaft at the right or the left side of the braking device, and wherein the brake arm extends vertically and is constructed such that the brake arm activates the braking member by swinging in a direction opposite to a direction in which the projecting portion extends.

3. A braking device for a straddle-type all-terrain vehicle according to claim 1, wherein the projecting portion extends rearwardly and at least a part of a rear end area of the projecting portion is formed so as to incline upwardly and rearwardly.

4. A braking device for a straddle-type all-terrain vehicle according to claim 2, wherein the projecting portion extends rearwardly, and at least a part of a rear end area of the projecting portion is formed so as to incline upwardly and rearwardly.

5. A braking device for a straddle-type all-terrain vehicle according to claim 1, wherein the connecting portion between the brake arm and the brake operating cable is provided with a buffer portion which allows a forward movement of the brake arm alone.

6. A braking device for a straddle-type all-terrain vehicle according to claim 2, wherein the connecting portion between the brake arm and the brake operating cable is provided with a buffer portion which allows a forward movement of the brake arm alone.

7. A braking device for a straddle-type all-terrain vehicle according to claim 3, wherein the connecting portion between the brake arm and the brake operating cable is provided with a buffer portion which allows a forward movement of the brake arm alone.

8. A braking device for a straddle-type all-terrain vehicle according to claim 4, wherein the connecting portion between the brake arm and the brake operating cable is provided with a buffer portion which allows a forward movement of the brake arm alone.

* * * * *